United States Patent
Suzuki et al.

(10) Patent No.: US 8,059,363 B2
(45) Date of Patent: Nov. 15, 2011

(54) MAGAZINE HOLDING STRUCTURE AND LIBRARY DEVICE HAVING THE SAME

(75) Inventors: Takeshi Suzuki, Tokyo (JP); Tadashi Kosugi, Tokyo (JP)

(73) Assignee: NEC Personal Products, Ltd., Tokyo (JP)

( * ) Notice: Subject to any disclaimer, the term of this patent is extended or adjusted under 35 U.S.C. 154(b) by 455 days.

(21) Appl. No.: 12/403,705

(22) Filed: Mar. 13, 2009

(65) Prior Publication Data

US 2009/0242498 A1  Oct. 1, 2009

(30) Foreign Application Priority Data

Mar. 25, 2008  (JP) ................................. 2008-078668

(51) Int. Cl.
*G11B 15/68*  (2006.01)
(52) U.S. Cl. .................. 360/92.1; 360/96.1; 360/96.51; 360/98.04; 369/30.69
(58) Field of Classification Search .................... 360/90, 360/91, 95, 96.1, 98.04; 369/30.68, 30.69
See application file for complete search history.

(56) References Cited

U.S. PATENT DOCUMENTS 5,157,564 A * 10/1992 Theobald et al. ............ 360/92.1
7,446,971 B2 * 11/2008 Thompson et al. ............ 360/91

FOREIGN PATENT DOCUMENTS

| DE | 10 2005 067 678 A1 | 6/2007 |
| DE | 602 22 045 T2 | 4/2008 |
| EP | 0 866 452 A1 | 9/1998 |
| JP | 1998255372 A | 9/1998 |

OTHER PUBLICATIONS

German Office Action for DE10 2009 014 049.2 issued Jul. 26, 2011.

* cited by examiner

*Primary Examiner* — Tan T. Nguyen

(57) ABSTRACT

The magazine includes a rail installed on its bottom surface approximately parallel to an insertion/extraction direction, the rail including a plurality of stepped portions formed at a side surface thereof. A device body includes: a lock lever installed rotatably within the same plane as the bottom surface of the magazine, the lock lever including one portion located in a space below the magazine and another portion located beside the magazine; a spring which urges in a direction in which the rail is installed so that a portion of the lock lever located in a space below the magazine is engaged with the stepped portion; and an accessor which moves beside the magazine along the insertion/extraction direction. The lock lever engaged with each stepped portion is released in such a way that the accessor rotates the lock lever in an opposite direction to an urging direction of the spring.

6 Claims, 10 Drawing Sheets

MAGAZINE HOLDING STRUCTURE AND LIBRARY DEVICE HAVING THE SAME

This application is based upon and claims the benefit of priority from Japanese patent application No. 2008-078668, filed on Mar. 25, 2008, the disclosure of which is incorporated herein in its entirety by reference.

BACKGROUND OF THE INVENTION

1. Field of the Invention

The present invention relates to a magazine holding structure and a library device having the same in which a degree that a magazine is extracted is stepwise controlled.

2. Description of the Related Art

A tape library device or a disk library device is commonly used to store program or data used in a computer with high reliability.

Typically, a library device includes a member called a magazine which accommodates a plurality of cartridges (for example, a storage medium or one which a magnetic tape and a reel are integrated in case of a tape library device) and a conveyor device called an accessor.

The inside of the magazine is divided into a plurality of cells which each can accommodate one cartridge respectively.

The accessor performs an operation which extracts a cartridge accommodated in a certain cell of a certain magazine and sets the cartridge to a drive device and an operation which accommodates a cartridge extracted from a drive device in a certain cell of a certain magazine.

In such a tape library device, when exchanging or loading cartridges into some cells in a magazine, the cartridges can be taken out of or inserted into the cells by extracting a magazine up to the cells. Also, since the whole magazine can be extracted from the device, a magazine can be taken out of a device or another magazine can be loaded into the device.

A technique for extracting a magazine from a library device is disclosed in Japanese Patent Application Laid-Open No. 10-255372.

In JP-A No. 10-255372, a tray (magazine) is stepwise opened (extracted) by setting a mode for fully opening a tray and a mail slot mode for opening a tray up to a medium position.

SUMMARY OF THE INVENTION

However, if a dedicated actuator is used to externally transport a magazine like an invention disclosed in JP-A No. 10-255372, components are increased, a dedicated control circuit is required, and thus the manufacturing cost is increased.

Moreover, since movable sections within a device are increased, a malfunction may frequently occur, thereby deteriorating reliability and durability of a device.

The invention address the above-identified and other problems associated with conventional methods and apparatuses, and a exemplary object of the invention is to provide a magazine holding device and a library device having the same in which a degree that a magazine is extracted can be stepwise controlled with a small number of components and a simple structure.

A first exemplary aspect in accordance with the invention provides a magazine holding structure having a mechanism to control an extraction of a magazine from a case, wherein the magazine includes a rail member which is installed on bottom surface of the magazine approximately parallel to an insertion/extraction direction, the rail member including a plurality of stepped portions formed at a side surface thereof; wherein the case includes a lock member which is installed rotatably within the same plane as the bottom surface of the magazine, the lock member including one portion which is located in a space below the magazine and another portion which is located beside the magazine, an urging member which urges in a direction in which the rail member is installed so that a portion of the lock member located corresponding to the bottom surface of the magazine is engaged with the stepped portion, and a movement mechanism which moves beside the magazine along the insertion/extraction direction of the magazine; and wherein the lock member engaged with each stepped portion is released in such a way that the movement mechanism moved in the extraction direction of the magazine rotates the lock member in an opposite direction to an urging direction of the urging member.

Also, a second exemplary aspect in accordance with the invention provides a library device including the magazine holding structure according to the first exemplary aspect of the invention including: a drive device which writes information into the cartridge and read information written in the cartridge, wherein the movement mechanism is an accessor which extracts, inserts and conveys the cartridge from the magazine.

DESCRIPTION OF THE EXEAMPLARY EMBODIMENT

A tape library device according to an exemplary embodiment of the present invention will be described below.

Figure 1:
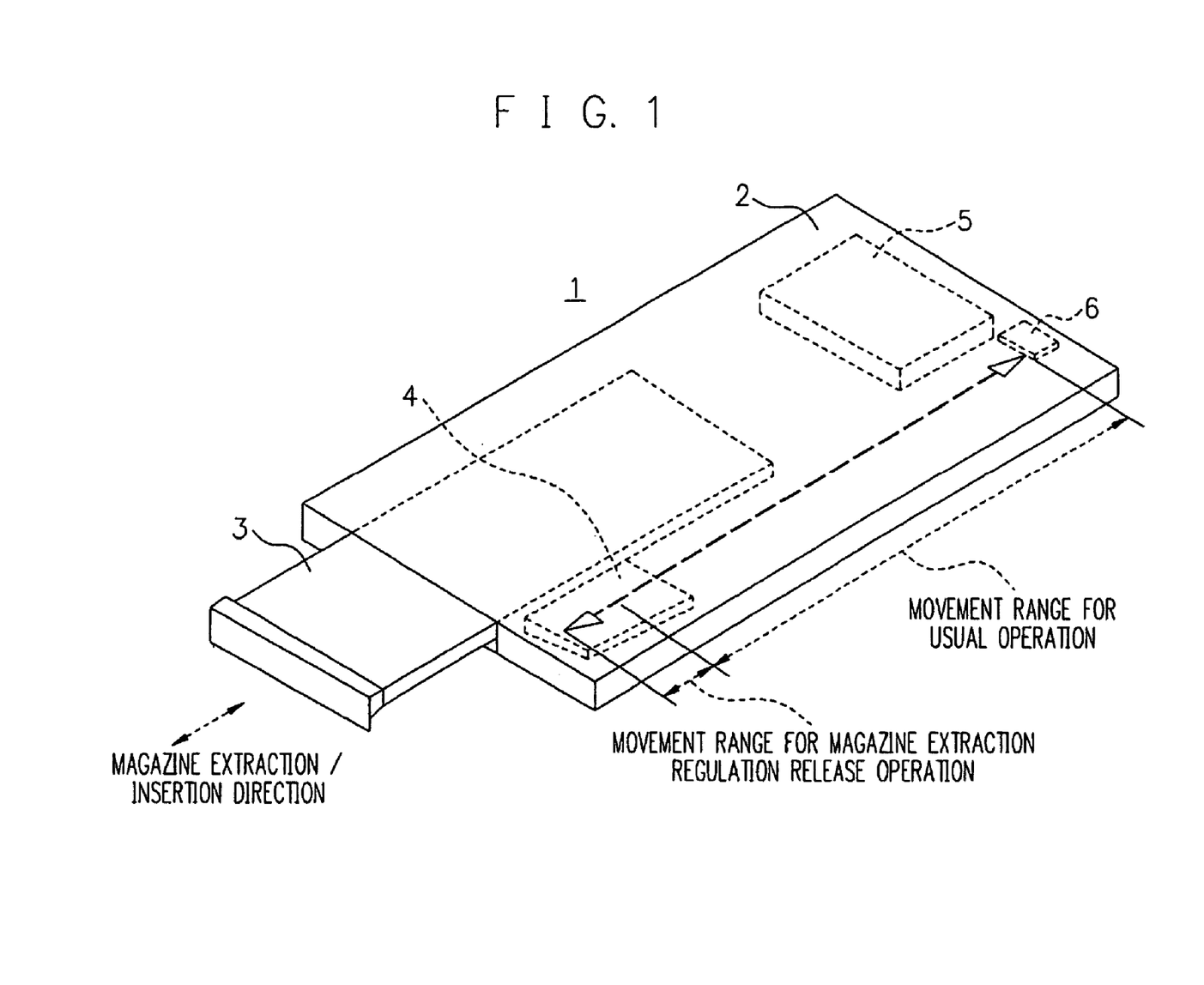
FIG. 1 is a view illustrating a configuration of a library device according to an exemplary embodiment of the invention.

FIG. 1 illustrates a configuration of a library device according to an exemplary embodiment of the invention.

A library device 1 has a structure in which a magazine 3 can be inserted into a device body 2. An accessor 4 is disposed at the side of an area in which the magazine 3 is disposed and performs reciprocating movement along a direction in which the magazine 3 is inserted into and extracted from.

In the accessor 4, a movement range for a magazine extraction regulation release operation is extended beyond a movement range for usual operations (an operation for extracting/inserting a cartridge from/into the magazine 3 and an operation for setting/removing the cartridge to/from a drive device 5). The magazine extraction regulation release operation will be described in detail later. The accessor 4 extracts, inserts and moves (conveys) a cartridge according to a control signal input from a controller 6.

Figure 2:
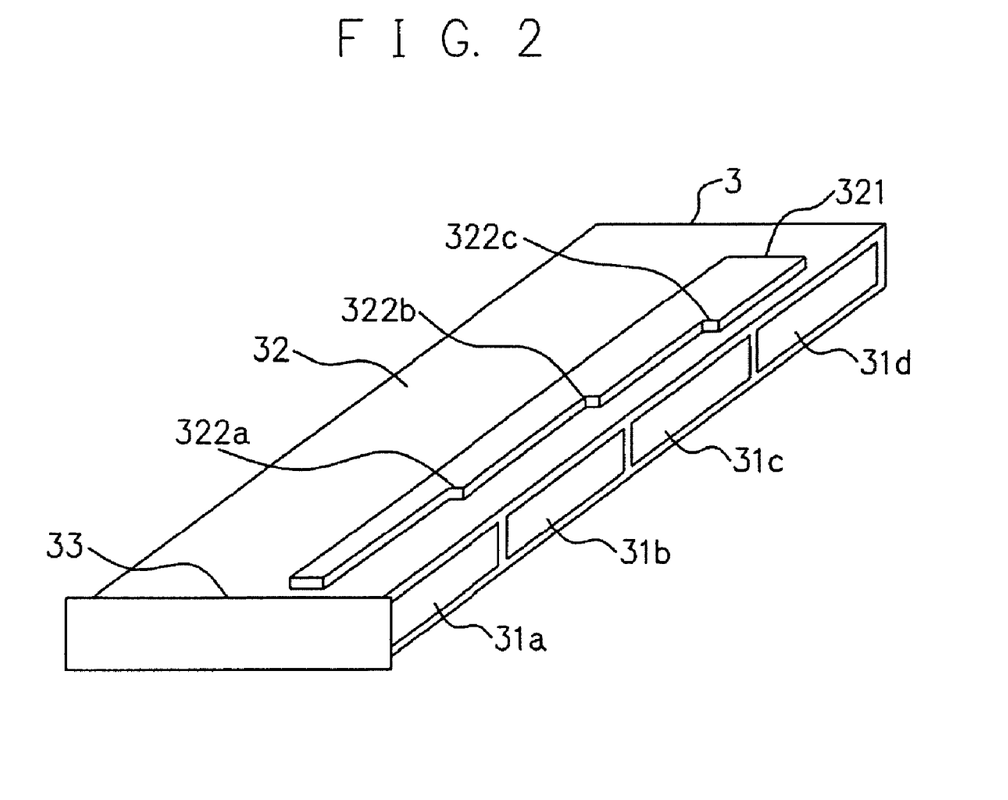
FIG. 2 is a view illustrating a configuration of a magazine.

FIG. 2 illustrates a configuration of the magazine 3. The magazine 3 is divided into a plurality of cells 31 (31a to 31d), and each cell can accommodate a cartridge. A rail 321 is installed on a bottom surface 32 of the magazine 3, approximately parallel to an extraction/insertion direction. A plurality of stepped portions 322 (322a to 322c) are formed on the side of the rail 321 facing the accessor 4. A handle 33 is formed at an end portion of an extraction direction to allow a user to easily insert/extract the magazine into/from the device body 2.

Figure 3:
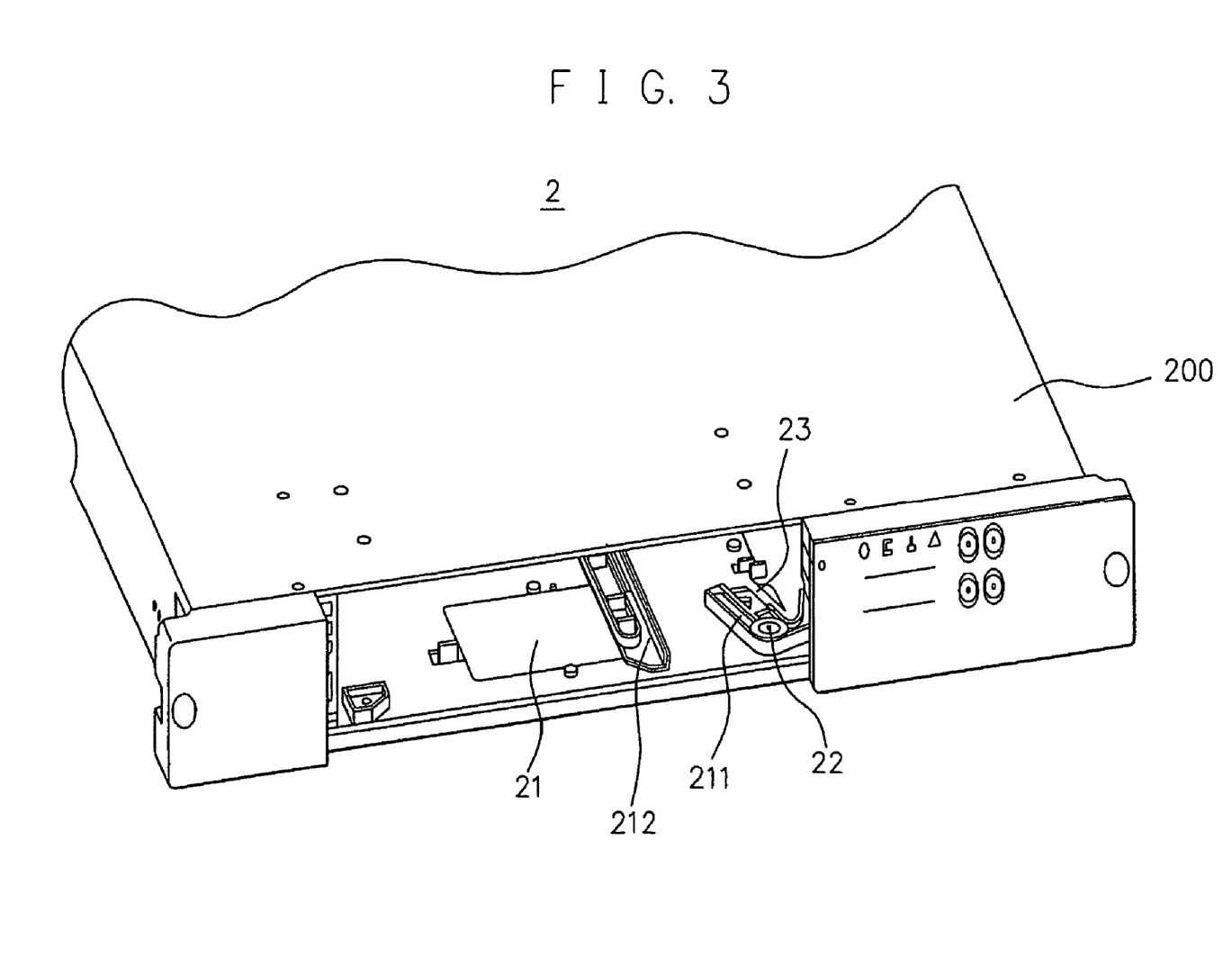
FIG. 3 is a view illustrating a configuration of a device body at neighborhood of a magazine accommodation unit.

FIG. 3 illustrates a configuration of the device body 2. A lock lever 211 and a rail 212 are installed in a magazine accommodation unit 21 which accommodates the magazine 3. The lock lever 211 is fixed to a case 200 through a fixing shaft 22; and is installed rotatably within a plane approximately parallel to a case surface. The lock lever 211 is installed such that its part is located between the case 200 and the bottom surface 32 of the magazine 3 when the magazine 3 is accommodated. Hereinafter, the part of the lock lever 211 disposed between the bottom surface 32 of the magazine 3 and the case 200 when the magazine is accommodated is referred to as an engagement portion.

Also, a part of the lock lever 211 is disposed to be located on an orbit of the accessor 4, and so when the accessor 4 comes in contact with the part, torque is generated and the lock lever 211 pivotally rotates about the fixing shaft 22. Also, a spring 23 is attached to the lock lever 211 to urge the engagement portion toward the rail 321 side.

Also, one of the stepped portions 322 may be disposed to be engaged with the lock lever 211 in a state that the magazine 3 is fully accommodated in the device body 2, so that the magazine 3 cannot be extracted from the device body 2 without performing a magazine extraction regulation release operation. The stepped portion 322 may also be formed corresponding to each cell 31, and so a structure that the magazine 3 can be extracted up to a location in which the cell 31 corresponding to the engaged stepped portion 322 is exposed outside the device body 2 when the lock lever 211 is engaged with one of the certain stepped portions 322 can be provided.

An operation (magazine extraction regulation release operation) for extracting the magazine 3 from the device body 2 in the library device 1 according to the exemplary embodiment will be described below. Here, for easy description, the configuration of the rail 321 including three steps (two stepped portions 222 (322a and 322b)) will be described and it is different from FIG. 2, but the essence of the operation is not limited to the number of steps of the rail. In the below description, steps of the rail 321 are denoted as a first step, a second step and a third step which are listed in an order in an extraction direction (from the handle 33 side) of the magazine 3.

Figure 4:
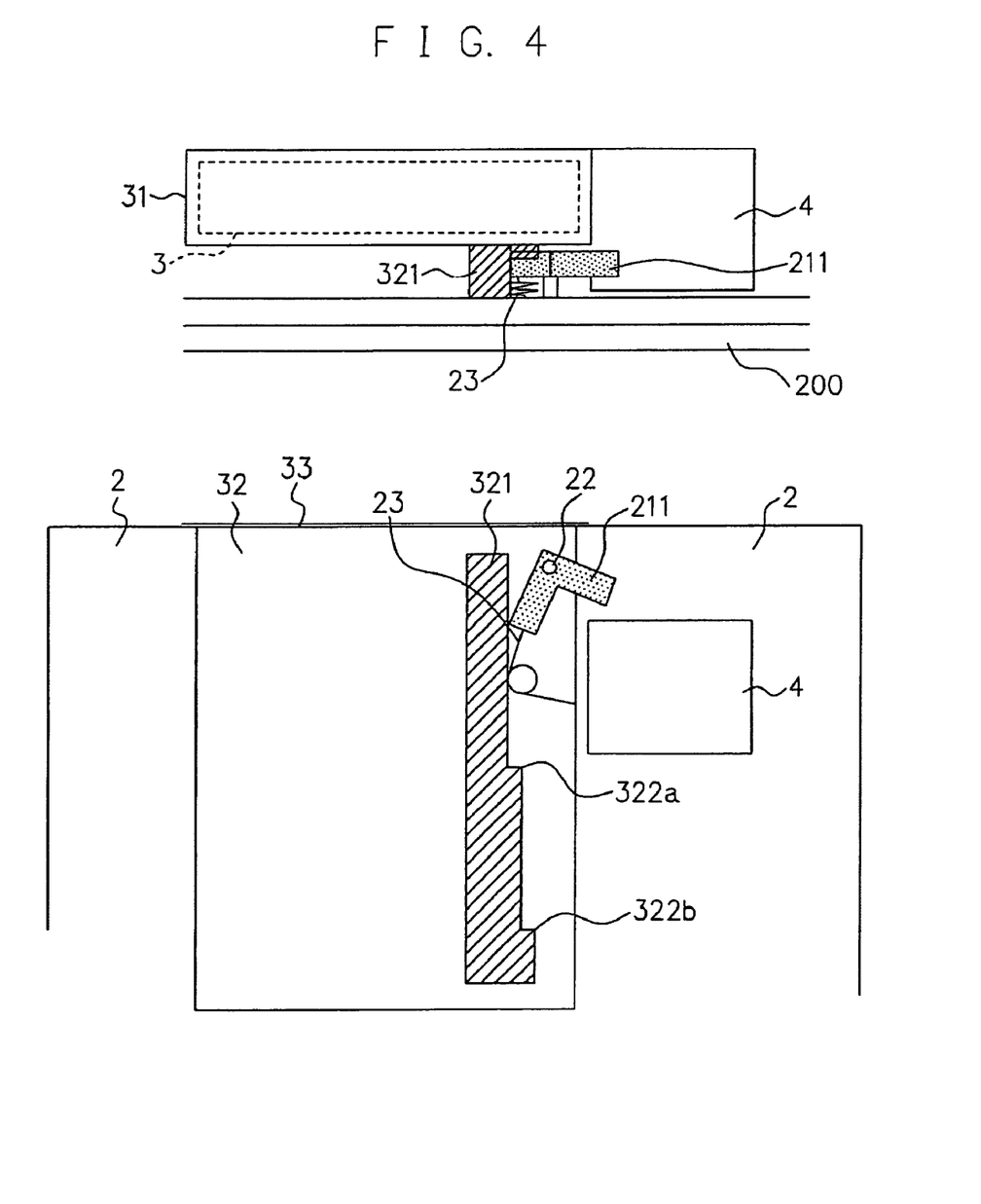
FIG. 4 is a view illustrating a magazine extraction regulation release operation.

FIG. 4 illustrates the magazine 3 which is fully accommodated in the case. Here, a state in which the bottom surface 32 of the magazine 3 is seen through the case 200 is illustrated.

When the magazine 3 is fully accommodated in the device body 2, the engagement portion protrudes toward an opposite side to the accessor 4 more than the second step of the rail 321 due to elastic force of the spring 23. Hereinafter, a term "protrude" means a state which protrudes toward an opposite side to the accessor 4.

Figure 5:
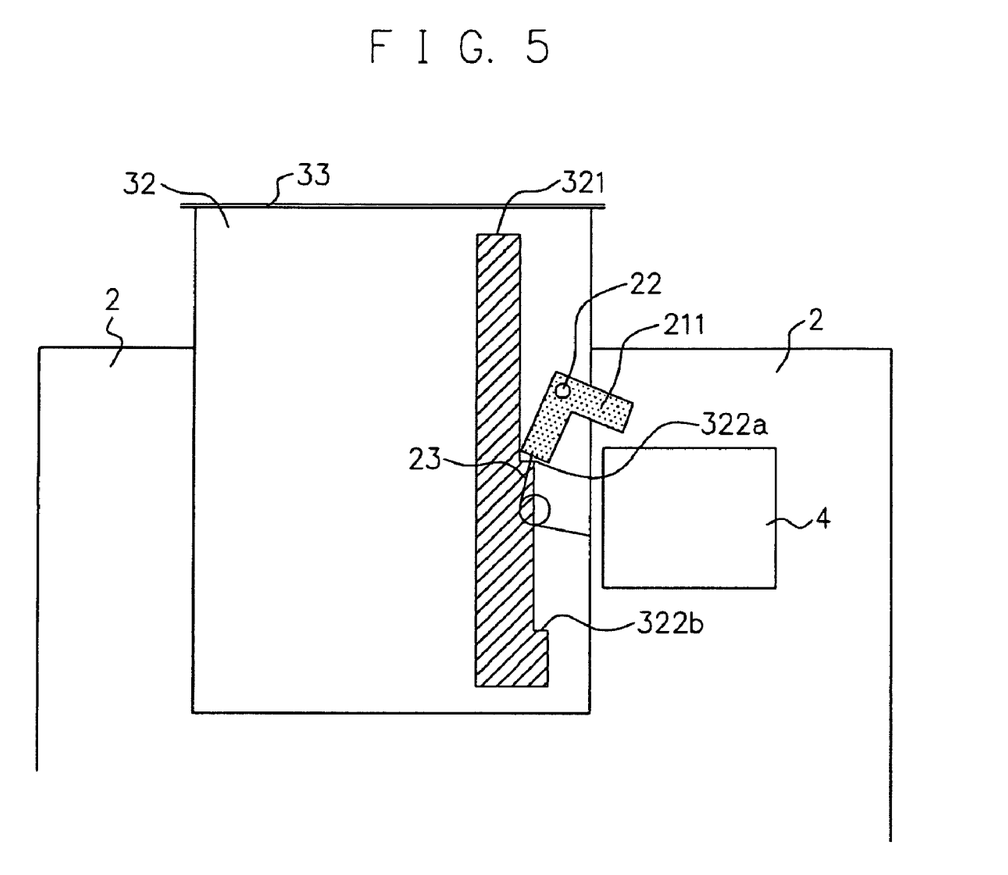
FIG. 5 is a view illustrating the magazine extraction regulation release operation.

If the magazine 3 is extracted from the device body 2 and the engagement portion reaches the stepped portion 322a, the magazine 3 is not extracted any more as illustrated in FIG. 5.

Figure 6:
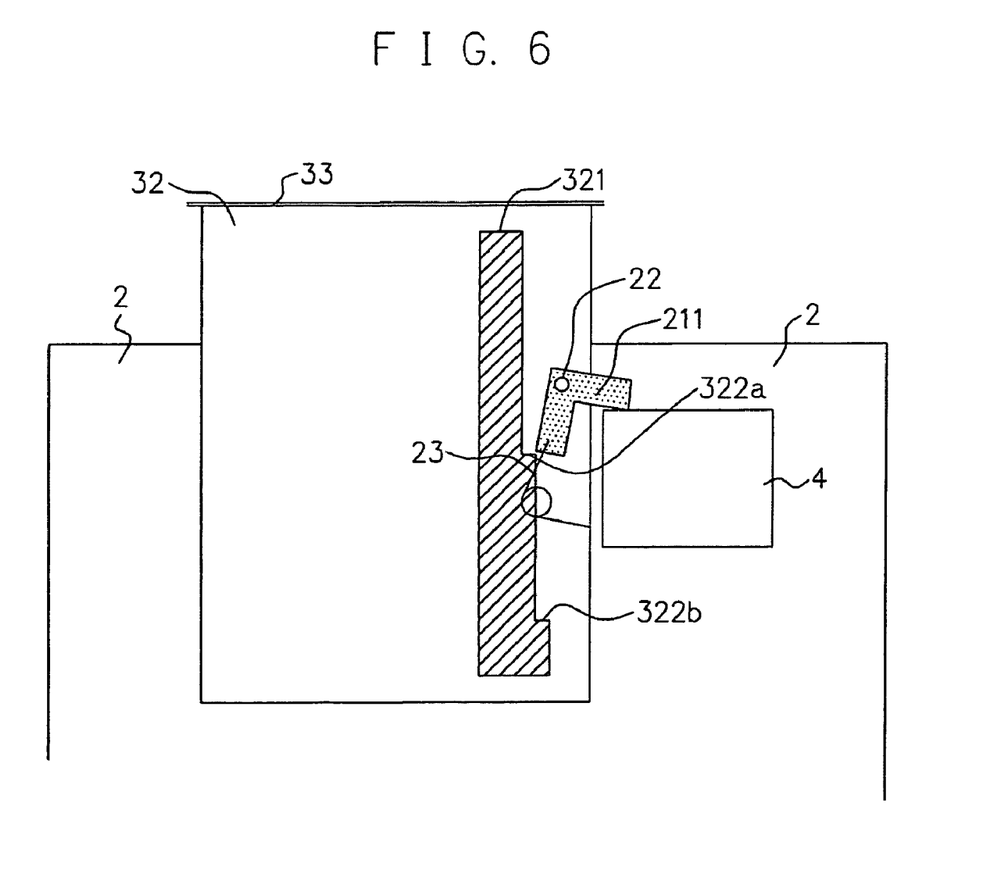
FIG. 6 is a view illustrating the magazine extraction regulation release operation.

When the accessor 4 is moved forward, the accessor 4 overcomes elastic force of the spring 23 to rotate the lock lever 211. Therefore, as illustrated in FIG. 6, the magazine 3 can be extracted up to a location corresponding to the second step of the rail 321 since the engagement portion does not protrude more than the second step of the rail 321 and protrudes more than the third step of the rail 321.

Figure 7:
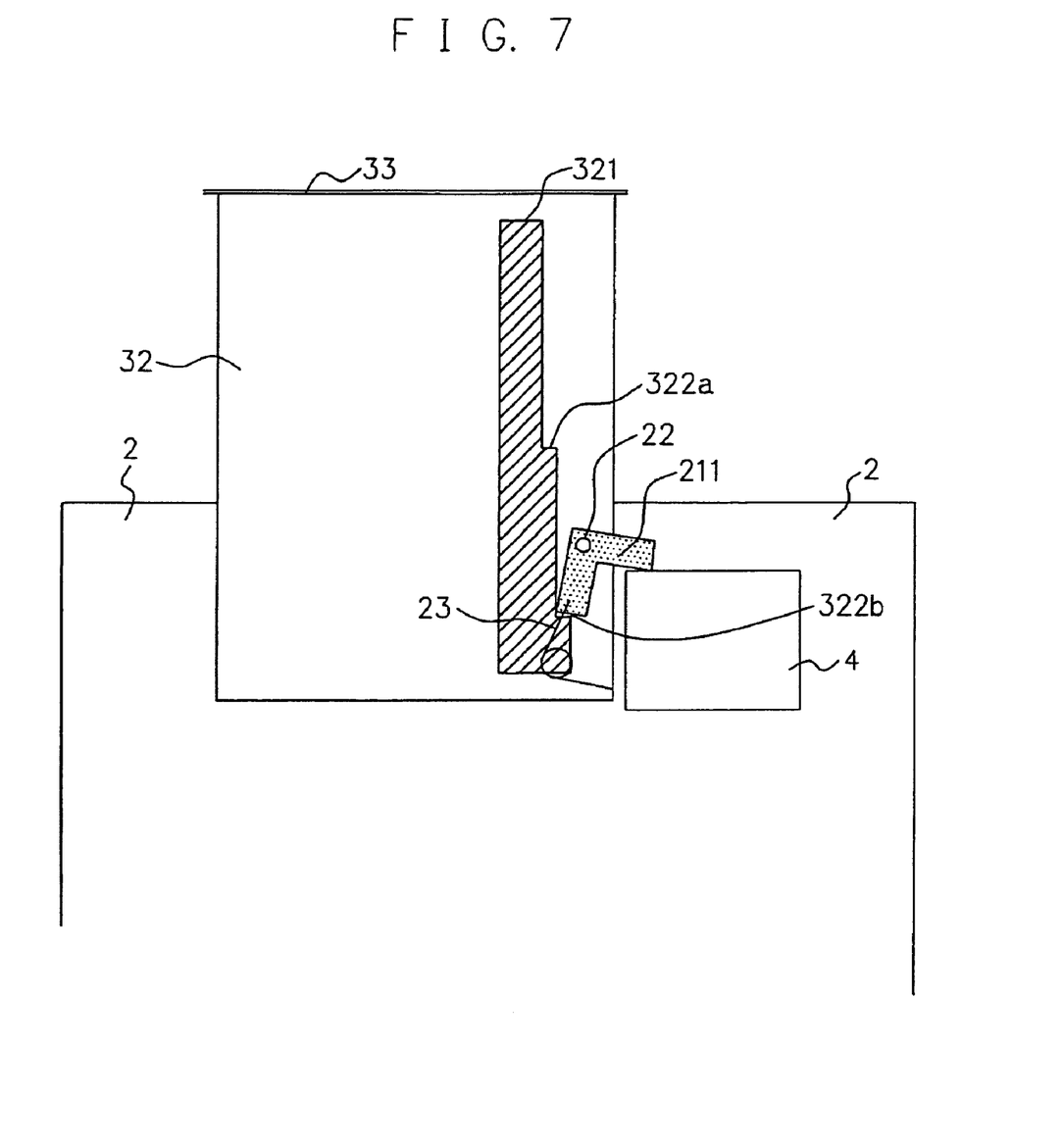
FIG. 7 is a view illustrating the magazine extraction regulation release operation.

When the magazine 3 is further extracted from the device body 2 and the engagement portion reaches the stepped portion 322b, the magazine 3 is not extracted any more as illustrated in FIG. 7.

Figure 8:
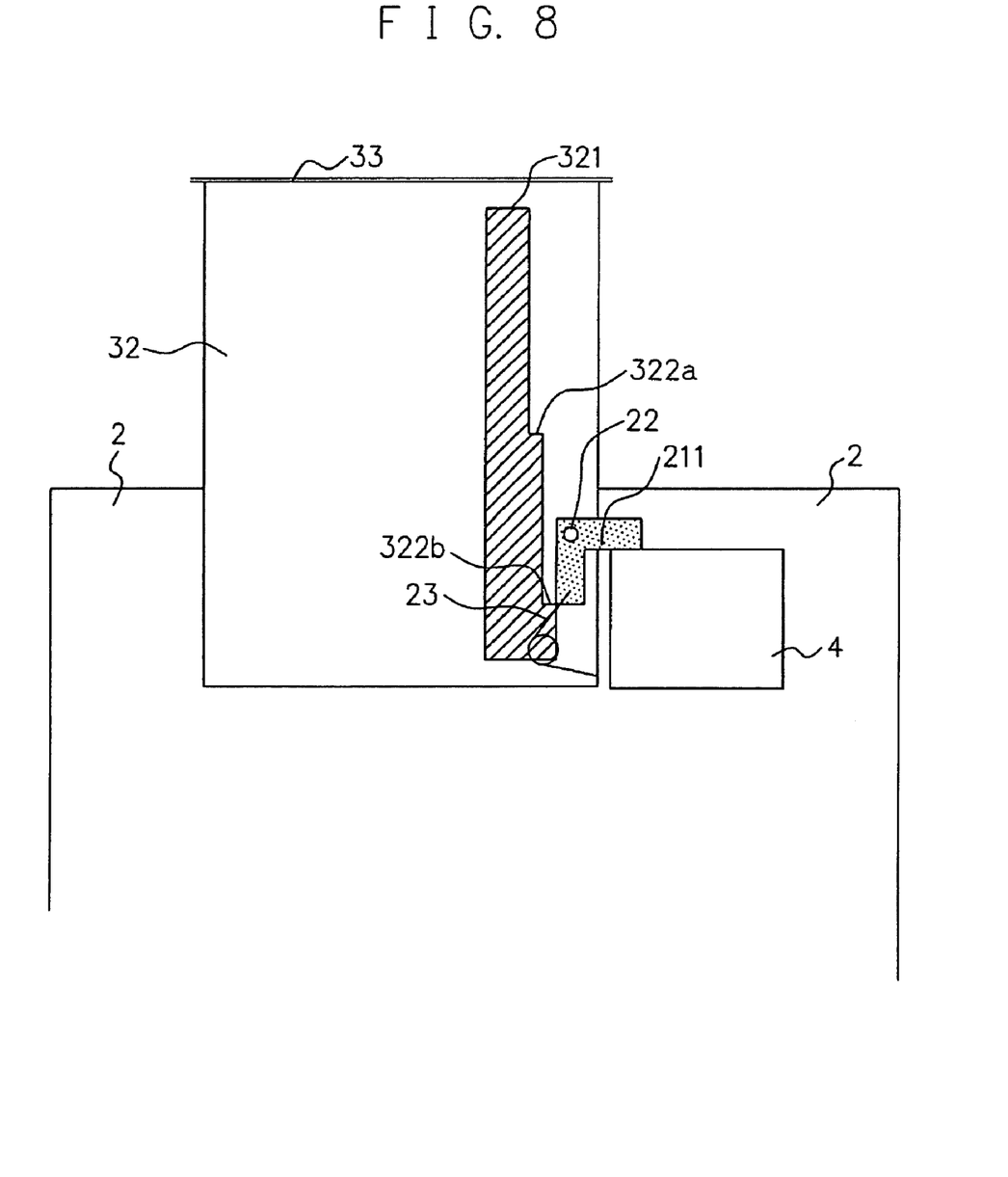
FIG. 8 is a view illustrating the magazine extraction regulation release operation.

When the accessor 4 is further moved forward and overcomes elastic force of the spring 23 to rotate the lock lever 211, the engagement portion is in a state which does not protrude more than the third step of the rail 321 as illustrated in FIG. 8.

Figure 9:
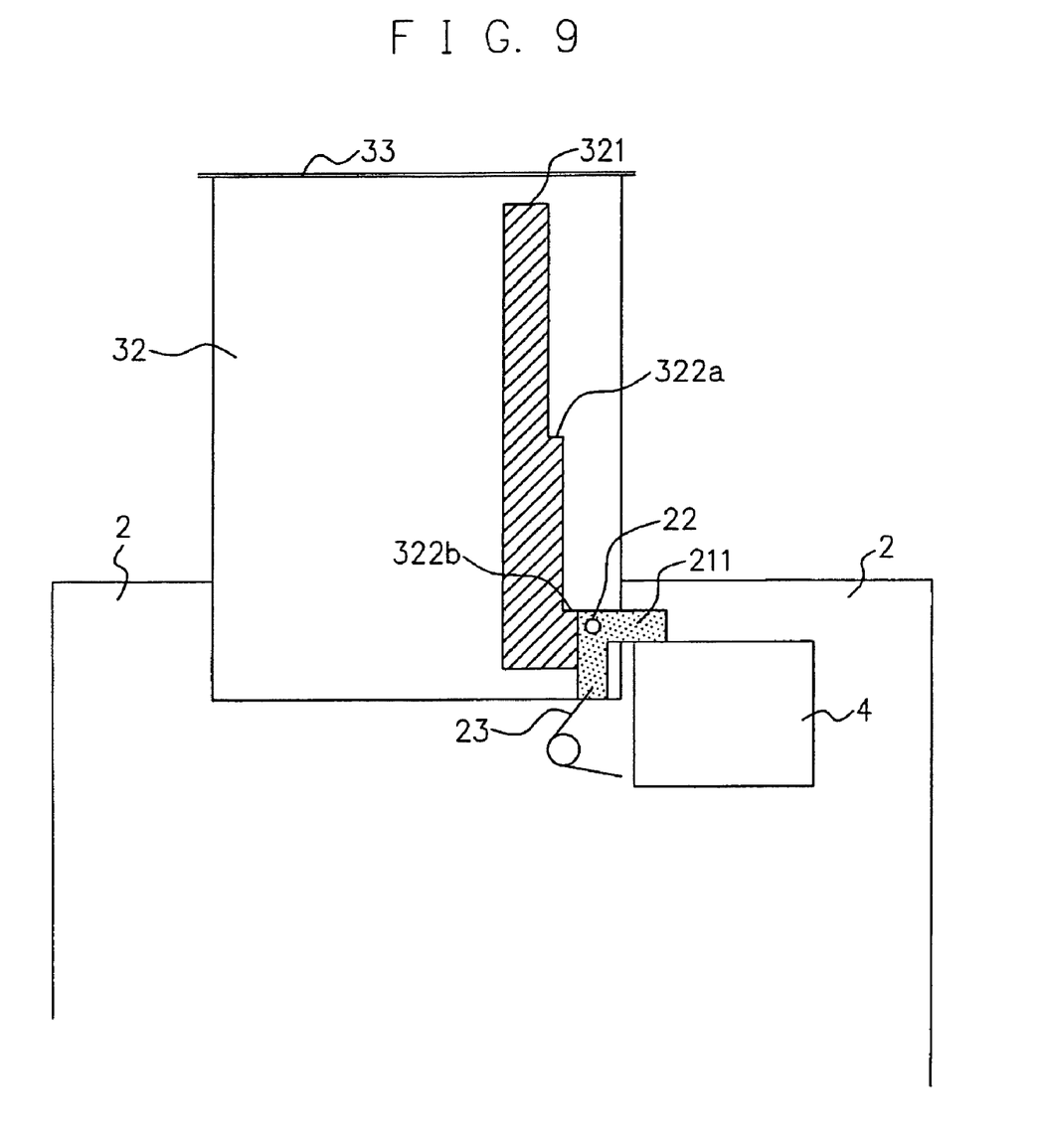
FIG. 9 is a view illustrating the magazine extraction regulation release operation.

In this state, the magazine 3 can be fully extracted as illustrated in FIG. 9.

As described above, the library device 1 according to the exemplary embodiment can regulate a degree that the magazine 3 is extracted according to an operation (location) of the accessor 4. Accordingly, since an actuator used to extract the magazine 3 or a control circuit thereof is not required and the number of components is not increased, the manufacturing cost can be reduced. Also, since movable sections within the device are not increased, malfunction factors is not increased, thereby leading to high reliability.

In the above description, the magazine 3 is fully extracted after undergoing a state which can be extracted up to the second step of the rail 321, but the magazine 3 may be configured to be fully extracted directly from an initial state.

Figure 10:
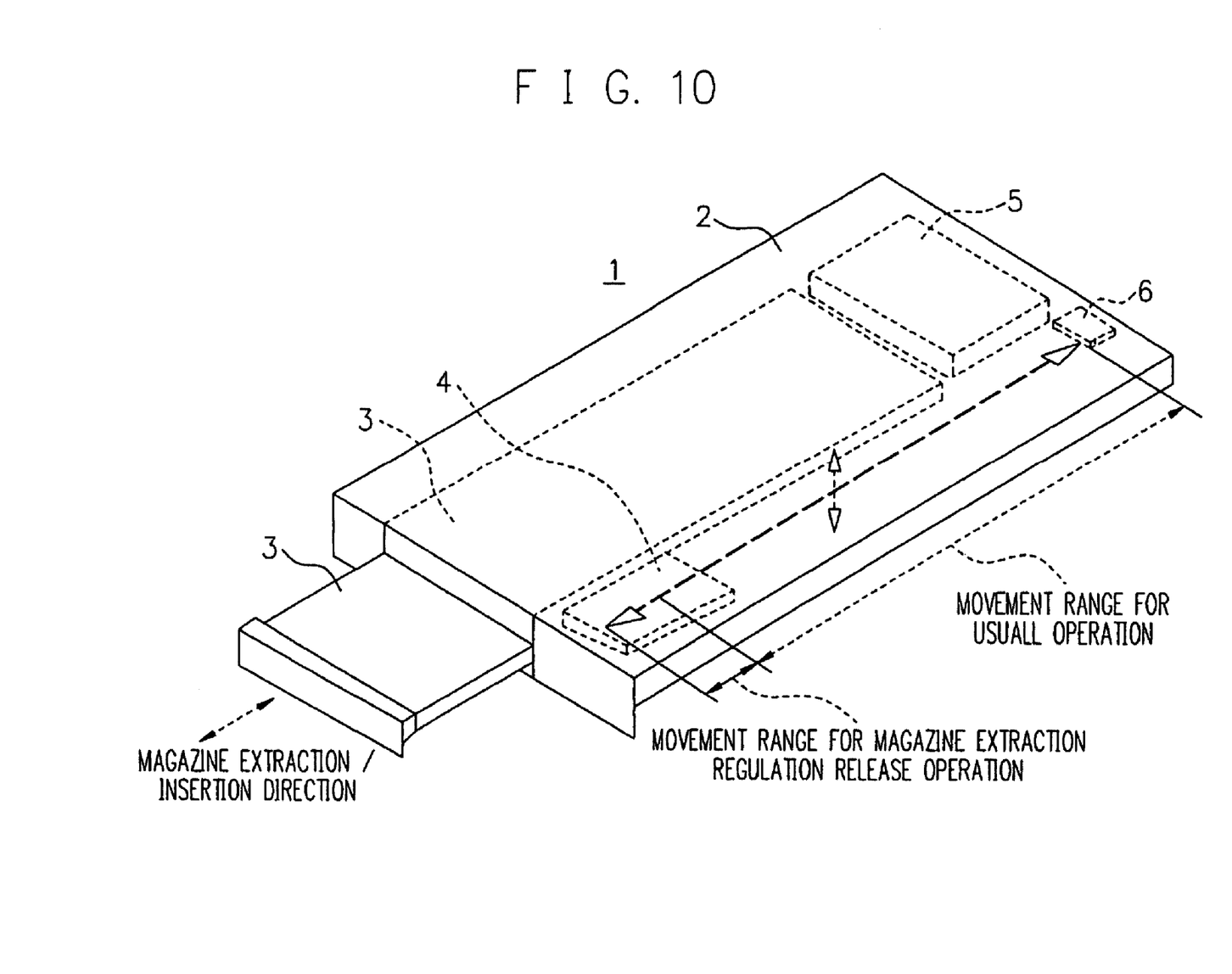
FIG. 10 is a view illustrating a configuration of the library device in which a plurality of magazines are stacked and accommodated.

Further, the invention can be applied to a library device in which magazines are stacked and accommodated on a plurality of layers, respectively, as illustrated in FIG. 10. In this case, for each magazine accommodated on each layer, a rail with a stepped portion is installed on a bottom surface of a magazine, and a lock lever which is rotatably supported and is urged by a spring is installed at a case side. Accordingly, each magazine accommodated on each layer can be individually stepwise extracted.

As described above, the present invention can be variously modified.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A magazine holding structure having a mechanism to control an extraction of a magazine from a case, wherein the magazine includes a rail member which is installed on bottom surface of the magazine approximately parallel to an insertion/extraction direction, the rail member including a plurality of stepped portions formed at a side surface thereof;

wherein the case includes a lock member which is installed rotatably within the same plane as the bottom surface of the magazine, the lock member including one portion which is located in a space below the magazine and another portion which is located beside the magazine, an urging member which urges in a direction in which the rail member is installed so that a portion of the lock member located corresponding to the bottom surface of the magazine is engaged with the stepped portion, and a movement mechanism which moves beside the magazine along the insertion/extraction direction of the magazine; and wherein the lock member engaged with each stepped portion is released in such a way that the movement mechanism moved in the extraction direction of the magazine rotates the lock member in an opposite direction to an urging direction of the urging member.

2. The magazine holding structure of claim 1, wherein one of the stepped portions is engaged with the lock member when the magazine is fully accommodated in the case.

3. The magazine holding structure of claim 1, wherein the magazine is provided with a plurality of cells which accommodate a cartridge having a recording medium therein, the stepped portions are formed respectively corresponding to the plurality of cells, and the magazine is extracted up to a location in which a cell corresponding to an engaged stepped portion is exposed outside the case when the lock member is engaged with one of the stepped portions.

4. A library device including the magazine holding structure of claim 3, comprising:

a drive device which writes information into the cartridge and reads information written in the cartridge, wherein the movement mechanism is an accessor which extracts, inserts and conveys the cartridge from the magazine.

5. The library device of claim 4, further comprising, a unit which controls the movement mechanism to be stopped at each location in which an engagement between the lock member and each stepped portion is released.

6. The library device of claim 4, wherein the magazine holding structure is a plurality of magazine holding structures.

* * * * *